(12) United States Patent
Anto Emmanuel

(10) Patent No.: US 8,125,998 B2
(45) Date of Patent: Feb. 28, 2012

(54) BACKUP SYSTEM AND METHOD FOR NETWORK DATA COMMUNICATIONS

(75) Inventor: Oliver Rex Anto Emmanuel, Oakville (CA)

(73) Assignee: Phybridge Inc., Mississauga (CA)

( * ) Notice: Subject to any disclaimer, the term of this patent is extended or adjusted under 35 U.S.C. 154(b) by 229 days.

(21) Appl. No.: 11/882,559

(22) Filed: Aug. 2, 2007

(65) Prior Publication Data

US 2009/0034410 A1   Feb. 5, 2009

(51) Int. Cl.
    H04L 12/28     (2006.01)
(52) U.S. Cl. .................. 370/401; 370/352; 370/466
(58) Field of Classification Search .......... 370/352, 370/401, 466
    See application file for complete search history.

(56) References Cited

U.S. PATENT DOCUMENTS

| | | | |
|---|---|---|---|
| 6,944,151 B1* | 9/2005 | Menard | 370/353 |
| 7,031,454 B1* | 4/2006 | Stelman | 379/387.01 |
| 2003/0169860 A1 | 9/2003 | Chou | |
| 2004/0128201 A1 | 7/2004 | Ofir et al. | |
| 2005/0078690 A1* | 4/2005 | DeLangis | 370/401 |
| 2006/0007915 A1* | 1/2006 | Frame | 370/352 |
| 2006/0018310 A1* | 1/2006 | Stevens et al. | 370/356 |
| 2006/0050682 A1* | 3/2006 | Vance | 370/352 |
| 2007/0167157 A1* | 7/2007 | Hundal | 455/426.1 |
| 2008/0101338 A1* | 5/2008 | Reynolds et al. | 370/352 |
| 2008/0168283 A1* | 7/2008 | Penning | 713/310 |
| 2008/0176548 A1* | 7/2008 | Liang | 455/419 |

FOREIGN PATENT DOCUMENTS

| | | |
|---|---|---|
| CA | 2028141 C | 9/1990 |
| TW | 246307 B | 12/2005 |

OTHER PUBLICATIONS

International Search Report for International Patent Application No. PCT/CA2008/001369, filed Jul. 24, 2008, Form PCT/ISA/210, ISA/CA, Gatineau, Quebec.
English-language abstract of TW246307 (B), esp@cenet, accessed: Apr. 8, 2009.

* cited by examiner

*Primary Examiner* — Jason Mattis
(74) *Attorney, Agent, or Firm* — Grant Tisdall; Gowling Lafleur Henderson LLP

(57) ABSTRACT

A system and method for coupling a communications device to a primary communications network having a first communications format and to a secondary communications network having a second communications format, such that the communications device is configured for having an assigned device identification and configured for using an assigned network address for use in routing data over the primary communications network. The system and method can comprise a first port configured for connecting to the communications device, a second port configured for connecting to the primary communications network and facilitating the communication of the data between the primary communications network and the communications device through the first port, and a third port configured for connecting to the secondary communications network and facilitating the communication of the data between the secondary communications network and the communications device through the first port. Also included is a switching module coupled to the ports and configured for facilitating a selected communication path of the data between either the first port and the second port or between the first port and the third port.

35 Claims, 9 Drawing Sheets

BACKUP SYSTEM AND METHOD FOR NETWORK DATA COMMUNICATIONS

BACKGROUND

It is crucial to keep lines of communications alive at all times. There are instances that stall or disrupt the continuous service that these communications provide. A network outage is an interruption in availability of the system due to a communication failure of the network. Reasons for a network outage are switch failure, network overload and migration to IP Telephony.

Migration to IP Telephony requires upgrading the network switches to support POE, bandwidth etc. As this transition is happening, network outage will take place. Disruption and delay caused by a network outage results in loss of critical communication such as IP Telephony as well as a significant cost to the organization experiencing the network outage. A power outage or loss of electricity supply can be another interruption to critical equipment such as IP Telephony.

Current solutions to the mentioned disruptions in communications are costly due to the complex nature of network topology. Options include redundant topologies or entire networks that have been replicated. This refers to various routes that communication can travel on; if there is a breakdown at any given point, communication can be re-routed to its destination. This solution could eliminate network downtime and increase reliability, however it can also mean that every single port and switch needs an alternate route, which can be difficult and expensive to set up.

Router clustering is another current solution or method which can help redundancy and therefore reliability of network. In this method, three or more routers are grouped together to combine speed and power and therefore increase redundancy. Another pro-active answer to power outages is uninterruptible power supply (UPS). This method maintains a continuous supply of electricity from a separate source in the event of an outage or abnormality. However, current UPS techniques need new cabling to all networking devices in the chain that need power.

The network environment is lacking a dependable backup system for network communications such as calls placed via an IP telephone. What is needed is a backup system to alleviate or otherwise mitigate at least some of the above-mentioned problems.

SUMMARY

Current solutions to the mentioned disruptions in communications are costly due to the complex nature of network topology. Options include redundant topologies or entire networks that have been replicated. This refers to various routes that communication can travel on; if there is a breakdown at any given point, communication can be re-routed to its destination. This solution could eliminate network downtime and increase reliability, however it can also mean that every single port and switch needs an alternate route, which can be difficult and expensive to set up. Contrary to current solutions there is provided a system and method for coupling a communications device to a primary communications network having a first communications format and to a secondary communications network having a second communications format, such that the communications device is configured for having an assigned device identification and configured for using an assigned network address for use in routing data over the primary communications network. The system and method can comprise a first port configured for connecting to the communications device, a second port configured for connecting to the primary communications network and facilitating the communication of the data between the primary communications network and the communications device through the first port, and a third port configured for connecting to the secondary communications network and facilitating the communication of the data between the secondary communications network and the communications device through the first port. Also included is a switching module coupled to the ports and configured for facilitating a selected communication path of the data between either the first port and the second port or between the first port and the third port.

A first aspect provided is an adapter for coupling a communications device to a primary data communications network having a first communications format and to a secondary data communications network having a second communications format, the communications device configured for having an assigned device identification and configured for using an assigned network address for use in routing data over the primary data communications network, the adapter comprising: a first port configured for connecting to the communications device and for providing operating power to the communications device; a second port configured for connecting to the primary data communications network and facilitating the communication of the data between the primary data communications network and the communications device through the first port; a third port configured for connecting to the secondary data communications network and facilitating the communication of the data between the secondary data communications network and the communications device through the first port; and a switching module coupled to the ports and configured for facilitating a selected communication path of the data between either the first port and the second port or between the first port and the third port, and configured for providing a selected power path for supplying the operating power through the first port, by way of the second port, or by way of the third port.

A further aspect provided is a method for coupling a communications device to a primary data communications network having a first communications format and to a secondary data communications network having a second communications format, the communications device configured for having an assigned device identification and configured for using an assigned network address for use in routing data over the primary data communications network, the method comprising the acts of: communicating the data to a first port connected to the communications device; providing electrical operating power to the device through the first port; selecting a communication path of the data between either the first port and a second port or between the first port and a third port, the second port connected to the primary data communications network for facilitating the communication of the data between the primary data communications network and the communications device through the first port, the third port connected to the secondary data communications network for facilitating the communication of the data between the secondary data communications network and the communications device through the first port; and selectively providing the electrical operating power by way of either the second port or by way of the third port.

BRIEF DESCRIPTION OF THE DRAWINGS

These and other features will become more apparent in the following detailed description in which reference is made to the appended drawings by way of example only, wherein:

FIG. 1b is a block diagram of a further embodiment of the environment of FIG. 1a;

FIG. 2 is a block diagram of an example configuration of the device and adapter of FIG. 1a;

FIG. 3 is an embodiment of the adapter of FIG. 1a;

FIG. 5a shows a switching example of the adapter of FIG. 1a;

FIG. 5b shows a further switching example of the adapter of FIG. 1a;

FIG. 5c shows a further switching example of the adapter of FIG. 1a; and

FIG. 5d shows a conversion example of the unit of FIG. 1a.

DESCRIPTION

VoIP Communications Environment 10

Figure 1A:
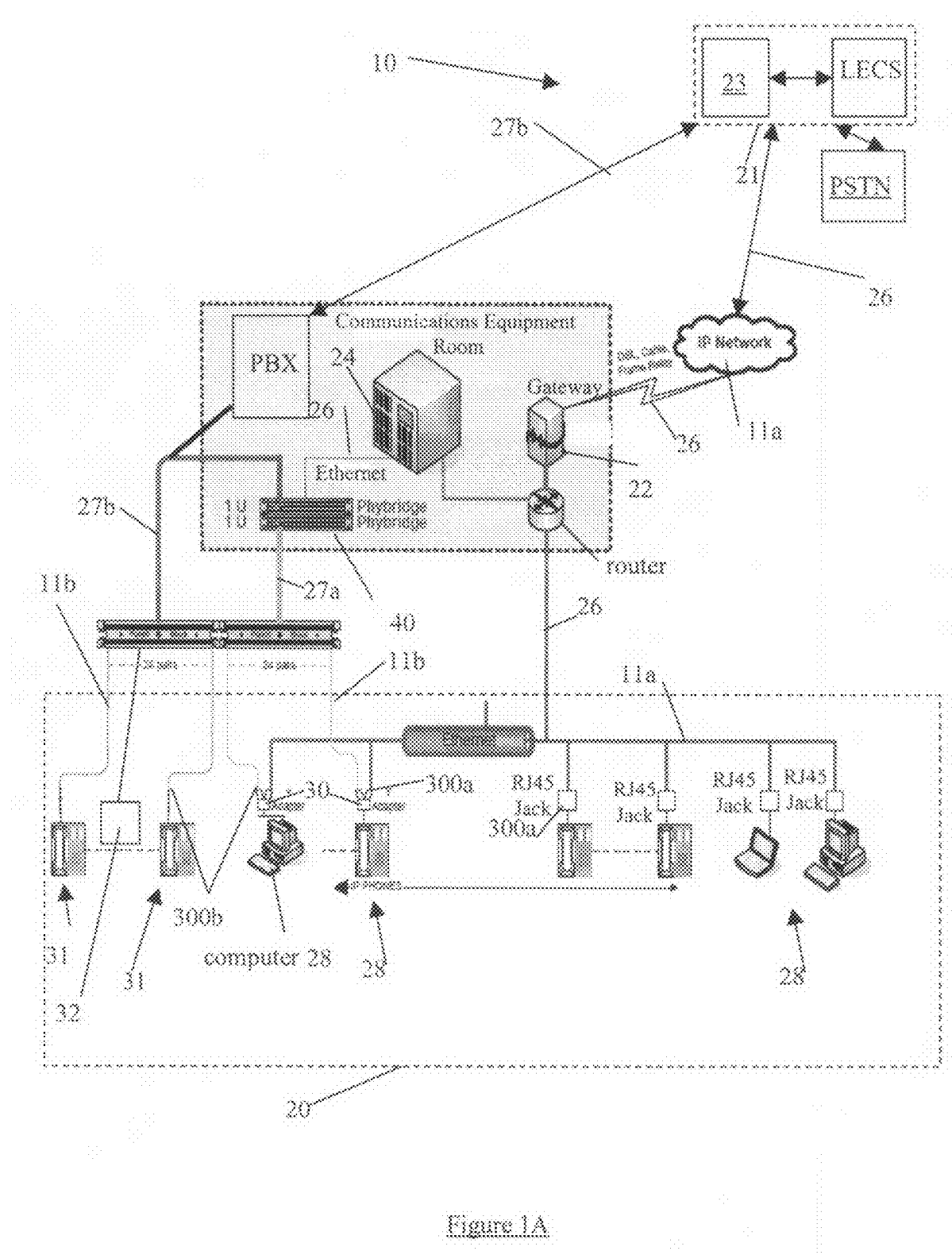
FIG. 1a is a block diagram of a communications environment.
Figure 4:
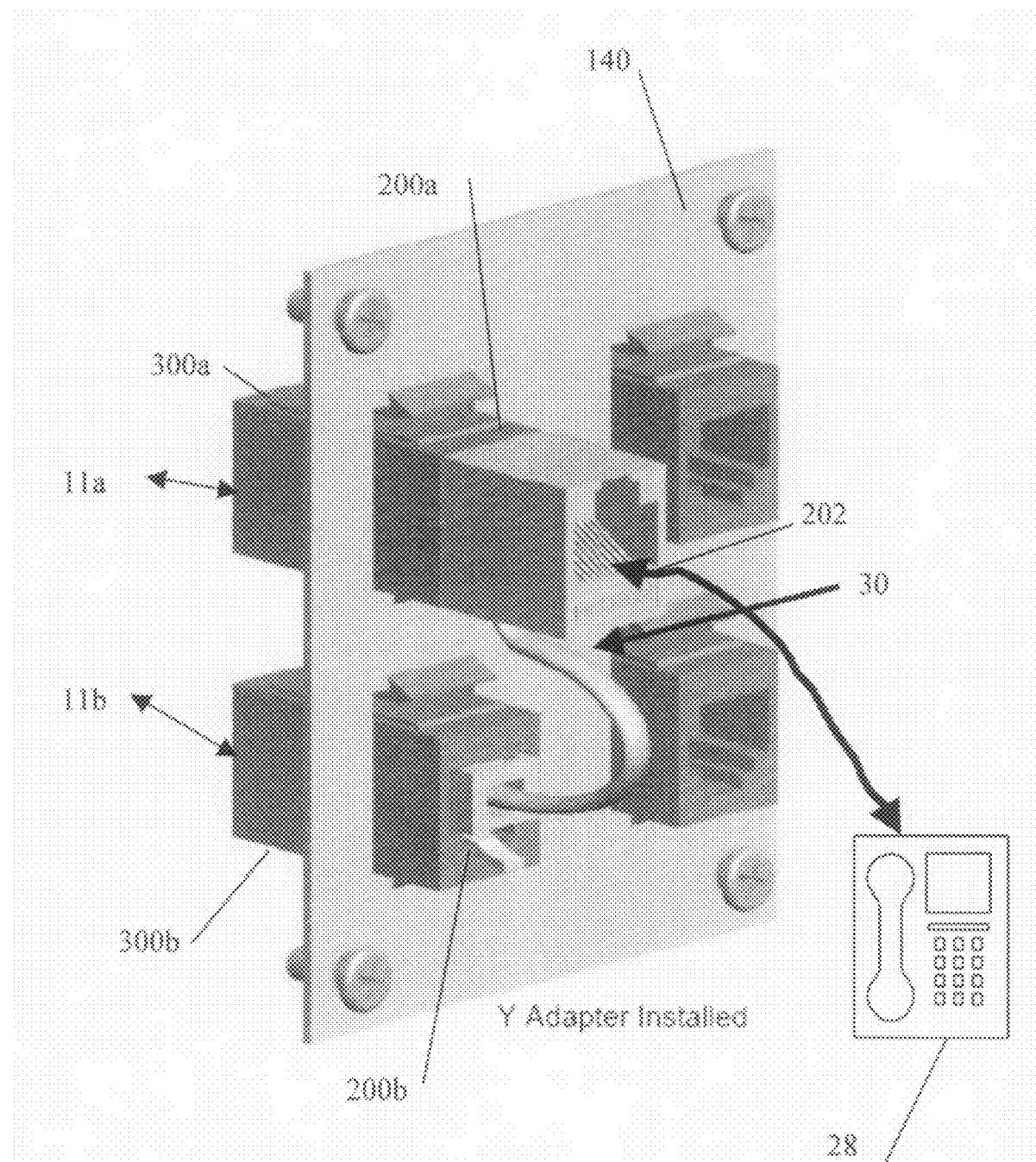
FIG. 4 shows an example implementation of the adapter of FIG. 3.

Referring to FIG. 1a, shown are communications environments 10, 20 that facilitate communication of packet-based call data 26 (e.g. voice and/or voice with associated video data—one embodiment of the data 26) over a packet-based data communications network 11a (e.g. a Wide Area Network WAN such as the Internet and/or a Local Area Network LAN such as an Ethernet) using packet-based telephony (e.g. IP telephony) with respect to a plurality of communication devices 28 (e.g. IP phones, computers, wired PDAs, etc.) distributed in a local communications environment 20. The communications device 28 is connected to the network 11a using a dynamically assigned network 11a address (e.g. a virtual telephone number/line, an IP address, a SIP address, etc.) via network jack(s) 300a (see also FIG. 4) that is used as a temporary (e.g. dynamically assigned) network 11a entry point for the communications device 28 (e.g. a call endpoint) for the user's current call session. The communications device 28 is also connected to a telephone network 11b (e.g. two-wire legacy phone cables), using digital communication (e.g. xDSL) data 27a communication formats, via telephone network jack(s) 300b (see also FIG. 4) that provide the network 11b entry point for the communications device 28, as well as for traditional telephones 31 in the communication of telephone data 27b, as further described below.

The local environment 20 can communicate with the external communications environment 10 via a network server 22 for packet-based call data 26 and via a PBX for traditional telephone communications 27b. It is also recognised that an IP PBX can be used to collect the call data 26, 27a from the communication devices 28 for communication as packet-based call data 26 (in the case of data 27a that data is converted into data 26 before communication over the network 11a) via the server 22 over the network 11a. It is also recognised that a conversion unit 40 can be used to convert any received telephone communications data 27a (e.g. in two-wire digital formats—xDSL) collected from the communication devices 28 over the network 11b (via a communication mode adapter 30) and convert the format of those communications 27a into the format as packet-based data 26 that is suitable for communication over the network 11a, as desired.

Referring again to FIG. 1a, it is recognised that the network jack 300a (e.g. RJ45 or other LAN compatible connection standard jack) does not have any dedicated telephone lines/numbers (e.g. physical/static telephone number/line), rather the network 11a address that is dynamically assigned to the communications device 28 is dependent upon a device ID of the communications device 28, as further described below, rather than the location and/or configuration properties of the network jack 300a. Voice over Internet Protocol (also called VoIP), IP Telephony, Internet telephony, Broadband telephony, Broadband Phone and/or Voice over Broadband, for example, is the routing of voice conversations over the Internet or through any other packet-based communications network 11a. Companies providing VoIP service can be referred to as VoIP providers, and protocols which are used to carry voice signals over the network 11a can be referred to as Voice over IP or VoIP protocols.

In comparison, the Private Branch eXchange (PBX) (as well as the IP PBX being a packet-based version of the POTS based PBX) is a telephone exchange that serves a particular business or office (e.g. environment 20), as opposed to one that a common carrier or telephone company operates for many businesses or for the general public. PBXs operate as a connection between a private organization—usually a business—and a public switched telephone network PSTN. Functionally, the PBX can perform three main duties, namely: establishing connections (circuits) between the telephone sets 31 of two users (e.g. mapping a dialled number to a physical phone 31, ensuring the phone isn't already busy); maintaining such connections as long as the users require them. (i.e. channeling voice signals between the users); and providing information for accounting purposes (e.g. metering calls). In addition to these basic functions, PBXs can provide other calling features and capabilities. Interfaces/protocols for connecting extensions to the PBX include: POTS (Plain Old Telephone System)—the common two-wire interface used in most homes; proprietary—the manufacturer has defined a protocol where one can only connect the manufacturer's sets to their PBX, but with more visible information displayed and/or specific function buttons; and DECT—a standard for connecting cordless phones. Interfaces/protocols for connecting PBXs to trunk lines include: standard POTS (Plain Old Telephone System) lines—the common two-wire interface used in most domestic homes; ISDN—the most common digital standard for fixed telephone 31 devices, supplied in either Basic (2 circuit capacity) or Primary (24 or 30 circuit capacity) versions; and RBS—(Robbed bit signaling) which delivers 24 digital circuits over a four-wire (T1) interface.

In the case of the IP PBX, interfaces/protocols for connecting communication device 28 extensions to the IP PBX (and the network 11a) include: Internet Protocol, for example, H.323 and SIP. Interfaces for connecting IP PBXs to trunk lines include Internet Protocol—H.323, SIP, MGCP; and Inter-Asterisk eXchange protocols that operate over IP.

The PBX can be used as a direct telephone communications interface between the communication environments 20 and the PSTN, via a Local Exchange Carrier LEC. For example, the PBX can provide for telephone communications 27a (e.g. POTS) between the traditional telephones 31, when using the network 11b via the jacks 300b, and a communication proxy system 21 (e.g. the LEC—and/or an SIP proxy server 23). The traditional telephones 31 are connected to the traditional telephone network 11b using the dedicated phone line/number via traditional phone jacks 300b (e.g. RJ11 having a statically assigned telephone number/line), see also FIG. 4. As discussed further below, the local environment 20 also has the communication mode adapter 30 that is used to coordinate the coupling of the communications device 28 to either the communications network 11a in the case of call data 26 to communicate such via the IP PBX to the communication proxy system 21, or to the telephone network 11b in the case of call data 27a to communicate such via the IP PBX to the communication proxy system 21.

It is recognised that the geographic/physical coordinates of the communication devices 28 that are wired (rather than wirelessly connected) to the network 11a can change, depending upon the user's location. The geographic location of a particular communication device 28 can change from one communication environment 20 to the next, e.g. from a user's home to the user's office building, as well as can change to different locations within a particular communication environment 20, e.g. from one office room/floor to the next. Each of the communication devices 28 is assigned the device identity that is carried with the communication device 28 (e.g. a MAC address), which is subsequently associated with the user of the communication device 28. All calls (e.g. voice/video data 26) made from the communication device 28 are associated with the assigned device identity of the communication device 28, including the virtual telephone number/line dynamically assigned to the communications device 28 coupled to the communications network 11a via the network jack 300a.

The communication devices 28 can be distributed in a plurality of communication environments 20 that are connected to the network 11a through the network jacks 300a via a network server 22. The network server 22 is used as a communications interface between the communication environments 20 and the network 11a. It is recognised that the environments 20 could be located on a network LAN (e.g. Ethernet 11a and legacy telephone wires 11b) and the external network 11a could be a WAN, e.g. the Internet, such that the network server 22 provides the communications gateway between the LAN and WAN. For example, the network server 22 can provide for data 26 communications between the communication devices 28 and the communication proxy system 21 (e.g. Local Exchange Carrier—LEC—and/or the SIP proxy server 23).

The communication devices 28 and their associated network jacks 300a are differentiated from traditional telephones 31 and their associated network jacks 300b in that the communication devices 28 are dynamically assigned their network 11a address (e.g. a virtual telephone number/line, IP/SIP address) independently of the jack 300a. For example, an SIP address is dynamically assigned to a recognised communications device 28 (via the device's ID). Once assigned, the network 11a recognises the network jack 300a as the network 11a connection point for communicating packet-based call data 26 to and from the communications device 28. The SIP (Session Initiation Protocol) can be used to supply one address to the user, which can be used for text, video, and/or voice communications. SIP addresses have the same format as email addresses and can be used via the SIP server 23 as an email address and mobile phone, work phone, and home phone numbers. The call data 26 includes the device identity that is associated with communications device 28, as further described below.

Communications Network 11a

For the communications devices 28 (e.g. an IP phone), there is no direct relationship between the physical wiring of the network jack 300a (see FIG. 4) and the number of IP telephone lines/numbers that the communications device 28 and the corresponding network jack 300a can support. For example, communications devices 28 operating on 100-Mbps Ethernet connections can theoretically support hundreds of phone lines/numbers. The number of telephone numbers/lines that the communication device 28 (through the network jack 300a) supports can be determined by the design of the communication device 28 user interface 102 (see FIG. 2), not the physical connectivity to the network 11a. The user interface 102 might be a traditional looking one that has a physical button for each line the communications device 28 supports. In particular, the communications network address is dynamically assigned to the communications device 28 via the network jack 300a, as further described below, as compared to the static or dedicated assignment of the telephone line/number to the telephone 31 via the network jack 300b. Accordingly, the jack 300a is configured so as to facilitate multi-line and/or network 11a applications.

One example of the communications network 11a is the Internet for the network outside of the environments 20, which is a worldwide, publicly accessible network of interconnected computer networks that transmit data (e.g. call data 26) by packet switching using the standard Internet Protocol (IP). The communications network protocol(s), in the case of the Internet protocols, can have three layers of protocols, namely: at the lower level (OSI layer 3) is IP (Internet Protocol—Ipv4, Ipv6), which defines the datagrams or packets that carry blocks of data (e.g. call data 26) from one node to another. ICMP (Internet Control Message Protocol) also exists at this level. ICMP is connectionless; it is used for control, signalling, and error reporting purposes; the TCP (Transmission Control Protocol) and UDP (User Datagram Protocol) exist at the next layer up (OSI layer 4), which are the protocols by which data 26 is transmitted; and the application protocols, sit on top of TCP and UDP and occupy layers 5, 6, and 7 of the OSI model, which defines the specific messages and data formats sent and understood by the applications running at each end of the communication over the network 11a (examples of these protocols are HTTP, FTP, and SMTP). There is another protocol (in layer 2 of the OSI model) below IP, namely PPP, and on LANs this protocol is nearly always Ethernet.

Ethernet is another example of the communications network 11a, and defines a number of wiring and signalling standards for the physical layer, through means of network access at the Media Access Control (MAC)/Data Link Layer and a common addressing format, used as the communications network protocol(s) of the Ethernet. Ethernet has been standardized as IEEE 802.3. The combination of the twisted pair versions of Ethernet for connecting end systems to the network 11a.

Above the physical layer, Ethernet stations of the network 11a communicate by sending each other data packets, small blocks of data that are individually sent and delivered. As with other IEEE 802 LANs, each Ethernet station can be given a single 48-bit MAC address, which is used both to specify the destination and the source of each data packet. Network interface cards (NICs) or chips normally do not accept packets addressed to other Ethernet stations. Currently Ethernet has many varieties that vary both in speed and physical medium used. Perhaps the most common forms used are 10BASE-T, 100BASE-TX, and 1000BASE-T. All three utilize twisted pair cables and 8P8C modular connectors via network jacks 300a (often referred to as RJ45). These jacks 300a and associated connectors/cables run at 10 Mbit/s, 100 Mbit/s, and 1 Gbit/s, respectively. Since packets are typically only delivered to the port they are intended for, traffic on a switched Ethernet (e.g. network 11a) can be slightly less public than on shared-medium Ethernet.

Referring again to FIG. 1a, an administration server 24 (or other mechanism such as an IP-PBX) facilitates the dynamic assignment/registration of the network 11a address (e.g. IP address, SIP address) to a particular communications device 28 located in the corresponding communications environment 20, as recognised by the network server 22. One example of this is where an IT person sets up an IP phone in a office of a company user, such that the administration server 24 assigns a selected IP address to the particular communications device 28 connected to the network 11a via the network jack 300a. Once registered, the particular communications device 28 is enabled to communicate via IP telephony over the network 11a with a communication proxy system 21. It is recognised that the above IP addresses also include transient IP addresses (leased) for routing using IP addresses.

One embodiment of the initialization process for the communications device 28, i.e. dynamic assignment of the network 11a address, is registration (e.g. DHCP, BOOTP, etc.) of the communications device 28 attempted with the network administrator server 24 (see FIG. 1). The registration process assigns an IP address to the communications device 28 from a pool of addresses for certain durations of time. DHCP, short for Dynamic Host Configuration Protocol, is a protocol for assigning dynamic network 11a IP addresses to the communication devices 28. The dynamic addressing facilitates the communications device 28 to have a different/selected IP address every time the communication device connects to the network 11a via the network jack 300a. It is recognised that the communication device's 28 IP address can change while the communication device 28 remains connected to the network 11a. DHCP lets the network administrator server 24 centrally manage and automate network 11a connection requests and their subsequent assignment of Internet Protocol (IP) addresses to the communication devices 28 connected to an organization's network 11a (e.g. intranet or LAN). Using the Internet Protocol, each communication device 28 connects to the Internet using a unique IP address, which is assigned by the administration server 24 when the Internet connection is created for a specific communication device 28. DHCP automatically assigns a new IP address when the communication device 28 is plugged into an entry point (e.g. network jack 300a) of the network 11a, using the concept of a "lease" or amount of time that the assigned IP address will be valid for a selected communication device 28. Another network IP management protocol is the Bootstrap Protocol (BOOTP). A DHCP or BOOTP client can be a program that is located in (and perhaps downloaded to) each communications device 28 and stored in the memory 110 (see FIG. 2) so that the communications device 28 can be configured for network 11a communications. For example, many ISPs use dynamic IP addressing for dial-up users.

Another embodiment of the registration process for the communication devices 28 is when the user logs on to the communications device 28 already connected to the network 11a. In this case, the communications device 28 can then register (e.g. sends an SIP message (an invite) over the network 11a to an SIP register which is maintained by the user's VoIP service provider) with the SIP proxy server 23 to facilitate dialing calls by methods other than using IP address. The SIP proxy server 23 can also provide hold and transfer services. In this case, the administration server 24 points to a DNS server (e.g. SIP server 23) on the network 11a and the administration server 24 will use the SIP proxy server 23 to register the communications device 28 with the SIP register. Once registered (e.g. the communications device 28 receives an SIP acknowledgement), two-way communication is enabled between the proxy server 23 and the communications device 28.

In view of the above, it is recognised that the administration server 24 may not need to monitor the telephone lines/numbers of the telephone jacks 300b, as these can contain dedicated telephone lines/numbers are statically assigned to the jacks 300b during physical installation thereof (e.g. the assignment of selected wire pair of the jacks 300b to a dedicated phone number/line as registered with the LEC). Accordingly, any telephone 31 connected to those jacks 300b can automatically assume the dedicated telephone lines/numbers of the respective jacks 300b that they are physically connected to (e.g. via telephone cords/cables). In the case of using the jacks 300b as an entry point to the network 11b for communication of the data 26 as backup/rerouted data 27a, the network jacks 300b can be configured through interaction with the bridge unit 40 as the end point destination for the data 27a received/intercepted by the unit 40 from the network 11a for transmission to the communications device 28 for eventual receipt as the data 26.

Telephone Network 11b

The telephone network 11b is connected to the public switched telephone network or PSTN and can be defined as providing plain old telephone service, or POTS, for communicating the data 27b of the legacy telephones 31, as well as for communicating the call data 27a (e.g. digital services—xDSL) for the communication devices 28 to the outside world (e.g. external to the environments 20). It is recognised that the network 11b can be used for connecting the legacy telephones 31 via the network jacks 300b for use in communicating the call data 27b as well as for connecting the communication devices 28 (via the adapter 30) for use in communicating the call data 27a. The telephone network 11b facilitates voice-grade telephone service (i.e. call data 27b) that is characterized by the dedicated/static telephone number that is assigned to a telephone network jack 300b (see FIG. 4). It is recognised that the dedicated phone number of the network jack 300b may also be assigned internally in a company to a specific extension number that is associated with the dedicated telephone number. In this case, each of the network jacks 300b can have a dedicated telephone extension number that is a subset of the dedicated telephone number for the company. In any event, it is recognised that the network jack 300b can have a dedicated telephone number/extension assigned thereto, such that any telephone 31 that is connected to the network jack 300b then assumes the dedicated telephone number/extension assigned to the network jack 300b. Further, the telephone network 11b can use digital switch/circuit technologies between telephone exchanges (e.g. Local Exchange Carrier—LEC) with analog two-wire circuits used to connect to most telephones 31 via the telephone network jacks 300b.

In general, the network jack 300b can be an RJ11/RJ12 jack, for example, which is a physical interface often used for terminating telephone 31 wires. As well, an RJ14 jack is similar to an RJ11 jack, but for a dedicated two-line network jack 300b, and an RJ25 jack is for a dedicated three line network jack 300b. It is recognised that other RJ jack 300b configurations can be used. In particular, the RJ11 jack uses two of the six positions to connect tip and ring requirements of the telephone 31. The RJ11 jack is typically a 6P4C jack, with four wires running to a central junction box, two of them unused. The extra wires can be used for various things such as a ground for selective ringers, low voltage for a dial light, or as an 'anti-tinkle' circuit to prevent a pulse dialing phone from ringing the bell on other extensions. With tone dialing, the extra wires/connectors can be used to provide flexibility so the jack 300b can be rewired later as RJ14 or to supply additional power for special uses. Similarly, the cables used to plug the telephone 31 (e.g. telephone terminals) into the RJ11 jacks frequently are four-wire cables with 6P4C plugs. The telephone line cables and its plug are more often a true RJ-11 with only two conductors. Accordingly, it is recognised that in an analog PBX or Key System, the number of twisted-pair cables connected to the telephone jack 300b determines how many telephone lines/numbers the telephone has access to. If more phone numbers/lines, are desired, one has to add more wires. This is still mostly true for digital TDM phones. An example is a Basic Rate Interface (BRI) phone with a twisted-pair cable carrying 2B+D—that is, two bearer channels (audio) plus one data channel (signalling).

Further, it is recognised that data devices 32, such as modems and facsimile machines, are also designed to use the data 27 communication service of the telephone network 11b to transmit digital information. Further, while the telephone network 11b provides limited communication features, low bandwidth and no mobile capabilities, it can provide greater reliability (e.g. dial-tone availability) than other telephony systems (mobile phone, VoIP, etc.). Services of the telephone network 11b via the PSTN provided via the telephone network communication protocol(s) to the telephones 31 include: bi-directional, or full duplex, voice path with limited frequency range of 300 to 3400 Hz as a signal to carry the sound of the human voice both ways at once; call-progress tones, such as dial tone and ringing signal; subscriber dialing; operator services, such as directory assistance, long distance, and conference calling assistance; and a standards compliant analog telephone interface including BORSCHT functions. BORSCHT is an acronym for: Battery feed; Overvoltage protection; Ringing; Supervision; Codec; Hybrid; and Testing. The electronic functions, collectively known as BORSCHT, are used in POTS telephony signalling, line supervision and telephone terminal operation. BORSCHT circuitry can be located on a telecommunications network line card and can be integrated into a chipset for implementation of a standard POTS telephone interface in desktop computers.

Accordingly, it is recognised that the communication device 28 could be connected to the network 11b also via the adapter having the network 11b interface comprising a standard POTS telephone interface, such that communication of the call data 27a is done via dial-up communication protocols and the adapter 30 converts the communication protocols between the packet-based data 26 of the communications device 28 and the dial-up communication protocol of the call data 27b.

The PSTN is the network of the world's public circuit-switched telephone networks, in much the same way that the Internet is the network of the world's public IP-based packet-switched networks. In terms of signalling protocols in the telephone network 11b, a pair of wires (facilitating the dedicated telephone number) from the central switch office to a subscriber's home is powered by 40V direct current (DC) and backed up by a bank of batteries (connected in series) in the central office, resulting in potential continuation of service during commercial power outages. The pair of wires can carry a "load" of about 300 Ohms of the telephone 31.

Telephone network communication protocol(s) of the telephone network 11b can include technical standards created by the ITU-T, for example, and use E.163/E.164 addresses (known more commonly as telephone numbers) for supplying the dedicated addressing of the telephone jacks 300b. For example, to carry a typical phone call from a calling party to a called party, the audio sound is digitized at an 8 kHz sample rate using 8-bit pulse code modulation (PCM). The call is then transmitted from one end to another via the telephone exchanges (e.g. LECs). The call is switched using a signalling protocol (SS7) between the telephone exchanges under an overall routing strategy. For data communication other than voice, some variants of DSL modem connections, like ADSL and VDSL, typically work by dividing the frequencies used in a single phone line of the telephone network 11b into two primary 'bands'. The ISP data is carried over the high frequency band (25 Khz and above) whereas the voice is carried over the lower frequency band (4 Khz and below). DSL filters are used for each telephone 31, which is used to filter out high frequencies from the telephone 31, so that the telephone 31 only sends or receives the lower frequencies (the human voice), creating two independent 'bands'. Thus the DSL and the phone 31 can simultaneously use the same dedicated phone line without interfering with one another.

In terms of data communication protocols, the network 11b can be used for analogue 27b communications, as well as digital data 27a communications enabled through a translation module 206 (when needed) of the adapter 30 (see FIG. 3) and the corresponding translation capability of the conversion unit 40. For example using an Analog Telephone Adapter (ATA) formatting scheme, the translation module 206 (and conversion unit 40) can convert analog signals 27b into another format (such as digital protocols for the data 27a). The ATA scheme translates analog calls into packets, and vice versa, thereby demodulating the analog signal and its values into a string of 0 and 1 values, i.e. digital information. The ATA scheme may provide a single function such as providing Internet telephone service or they may convert digital signals into several different forms such as audio, data, and video. ATA schemes can convert both the audio signals (voice) and control signals (such as touch tone or hold requests) into forms that can be sent and received via the packet-based network 11a. One type of ATA scheme is a Foreign Exchange Station (FXS) to USB Adapter, which connects via an RJ11 connector to a computer via the computer's USB port. Another type of ATA scheme directly performs the analog-to-digital voice conversion, and is configured to format the data 27a for communication using protocols such as SIP, H.323, IAX, or MGCP. Voice signals can be encoded and decoded using GSM, A-law, u-law and other such voice codecs.

In terms of communication devices 28, the network 11b can also handle direct digital communication of the data 27a using an xDSL format as done through the module 206 of the adapter 30 and the conversion unit 40, when needed, which converts data from the digital signals used by the communications device 28 into a voltage signal of a suitable frequency range which is then applied to the network 11b. xDSL Refers collectively to all types of digital subscriber lines, the two main categories being ADSL and SDSL. Two other types of xDSL technologies are High-data-rate DSL (HDSL) and Very high DSL (VDSL). DSL (Digital Subscriber Line). In general DSL formatting uses sophisticated modulation schemes to pack data 27a onto copper wires of the network 11b in a DSL digital format.

It is recognised that the network 11b can utilize circuit switched and/or packet-based communications traffic (e.g. riding on top of the DSL layer, packet-based transport is used to replacing traditional circuit-switched transport). In the packet-based model, communications traffic data 26, 27a is encapsulated into variable-length packets or fixed-length cells, which are switched or routed over the network 11a directly or over the network 11a via the network 11b, based on information in the packet or cell header of the data 26, 27a.

In any event, it is recognised that there can be differing data communication formats used for the data 27 on the network 11b and for the data 26 on the network 11a, such that the adapter 30 provides for format conversion between the network 11b and the communications device 28 (e.g. for data 26 to data 27a and vice versa) and the conversion unit 40 provides for format conversion between the network 11a (e.g. external to the environment 20) and the network 11b (e.g. for data 26 to data 27 and vice versa).

Conversion Unit 40

Figure 1B:
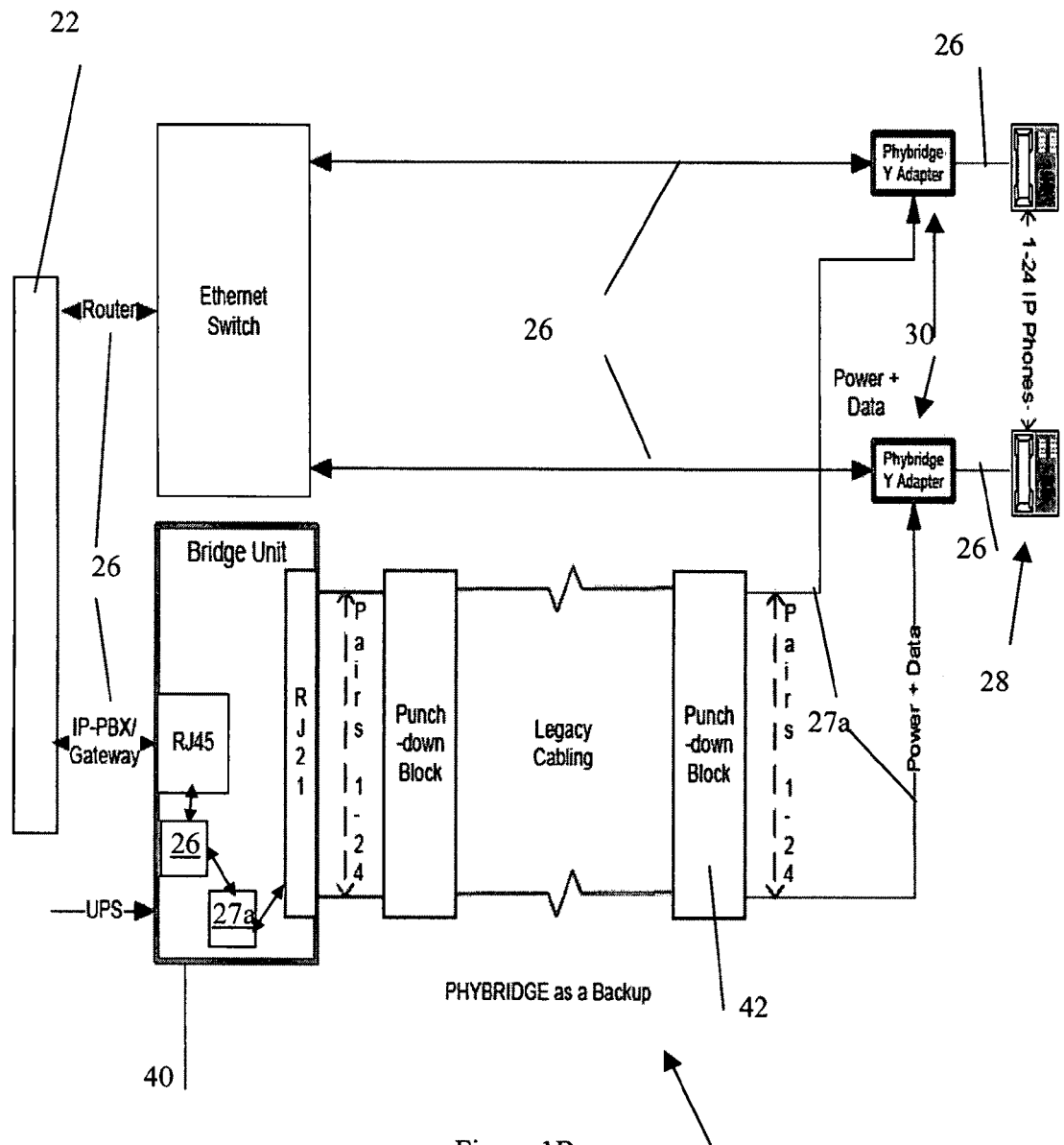

Referring to FIG. 1b, in terms of the conversion unit 40, the local environment 20 communicates the call data 26 from the communication device 28 via the adapter 30 to the network server 22 (e.g. network 11a gateway). The environment 20 also provides for communication of data 27a to the conversion unit 40 also via the adapter 30. In particular, the data 27a can be collected over two-wire pairs connected to a punch block 42 that is in turn connected to an RJ 21 interface of the conversion unit 40. The conversion unit 40 in turn can transform the communication format from the communication format of communications 27a to a packet-based data 26 communications format recognised by the network 11a (and vice versa), such as but not limited to an Ethernet compatible format. The conversion unit 40 is connected to the network server 22 via a network 11a compatible connection (e.g. RJ45 also referred to as 8P8C for eight positions eight conductors defining a modular connector with eight positions, all containing conductors).

The punch block 42 (also called punchblock, punchdown block, quick-connect block and other variations) is a type of electrical connection often used in telephony. The punch block 42 uses solid copper wires that are punched down into short open-ended slots known as Insulation-displacement connectors. These slots, usually cut crosswise (not lengthwise) across an insulating plastic bar, contain two sharp metal blades, which cut through the wire's insulation as it is punched down. These blades hold the wire in position and make the electrical contact with the wire as well. The RJ21 is an example of a registered jack standard for a modular connector using 50 conductors, usually used to implement a 25-line (or less) telephone connection for traditional telephones 31 vi the punch block 42.

Further, it is recognised that adapter 30 can work with the conversion unit 40, which is capable of handling wire protocols (e.g. two wire) and facilitates bridging between the bank of wire pair inputs of the data/power format (e.g. from the RJ 21 interface) to Ethernet (e.g. via the RJ 45 interface). The conversion unit 40 can also supply power 25 (see FIG. 3) to the adapter 30 over the same pair of wires that carries data 26, 27a. Optionally the conversion unit 40 can function as a PSE (Power Sourcing Equipment) that supports POE (Power over Ethernet) to power PDs (Powered Devices).

Accordingly, the unit 40 receives the data 26 from the communications device 28 as the transformed data 27a, when routed/switched through the adapter 30 over the network 11b. The unit 40 transforms the received data 27a back into the data 26 format suitable for communication over the network 11a. The unit 40 stores in a routing table that the particular communications device 28 (with corresponding network 11a address) is now configured for communicating data 27a over the network 11b rather than over the network 11a. The table is used by the unit 40 to map any incoming data 26 from the network 11a to a particular communications device 28 on a particular port 300b of the network 11b. The unit 40 also becomes the call endpoint for any incoming data 26 (e.g. external to the environments 20) destined for the communications device 28. This endpoint can be defined/inserted in the header of the data 26 during the conversion by the unit 40 of the data 27a to the data 26. Upon receipt of any data 26 from the network 11a (e.g. from a networked device on the network 11a external to the environment 20), the unit 40 notes with respect to the table which particular communications device 28 the data 26 is destined for (e.g. notes the network 11a address of the communications device 28), converts the data 26 into the data 27a format, and then communicates the data 27a to the appropriate jack 300b (assigned to the particular communications device 28) over the network 11b to the port 200b to which the particular communications device 28 is coupled (via the adapter 30). The adapter 30 receives the data 27a from the unit 40 and then converts the data 27a into the data 26 format for subsequent transmission via the device port 202 to the communications device 28. Accordingly, the cooperation of the unit 40 and the adapter 30 provide for data 26 as input/output with respect to the unit 40 and the network 11a and data 26 as input/output with respect to the adapter 30 and the communication device 28. Only between the adapter 30 and the unit 40 is the data 26 communicated as transformed data 27a.

Figure 5A:
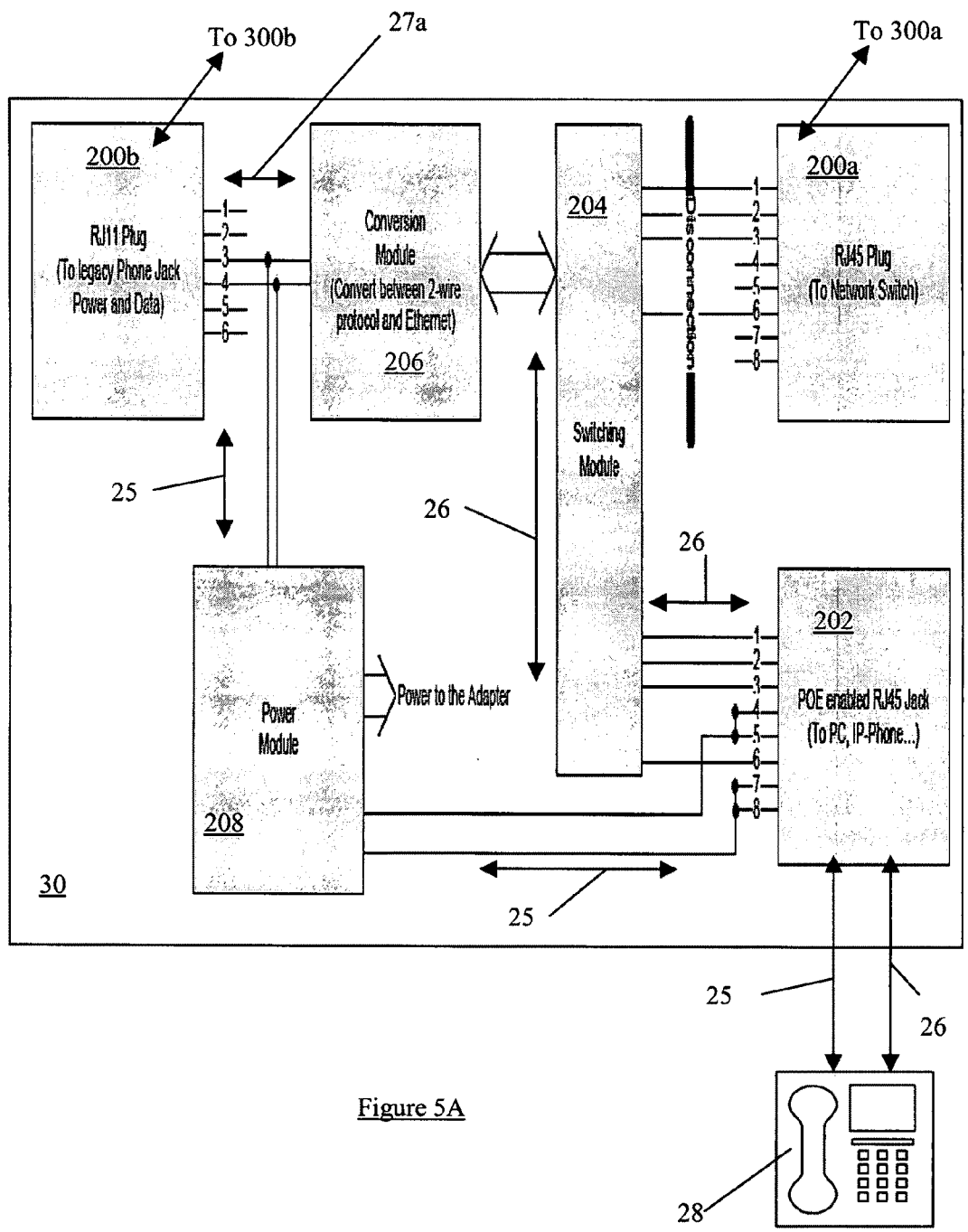
Figure 5B:
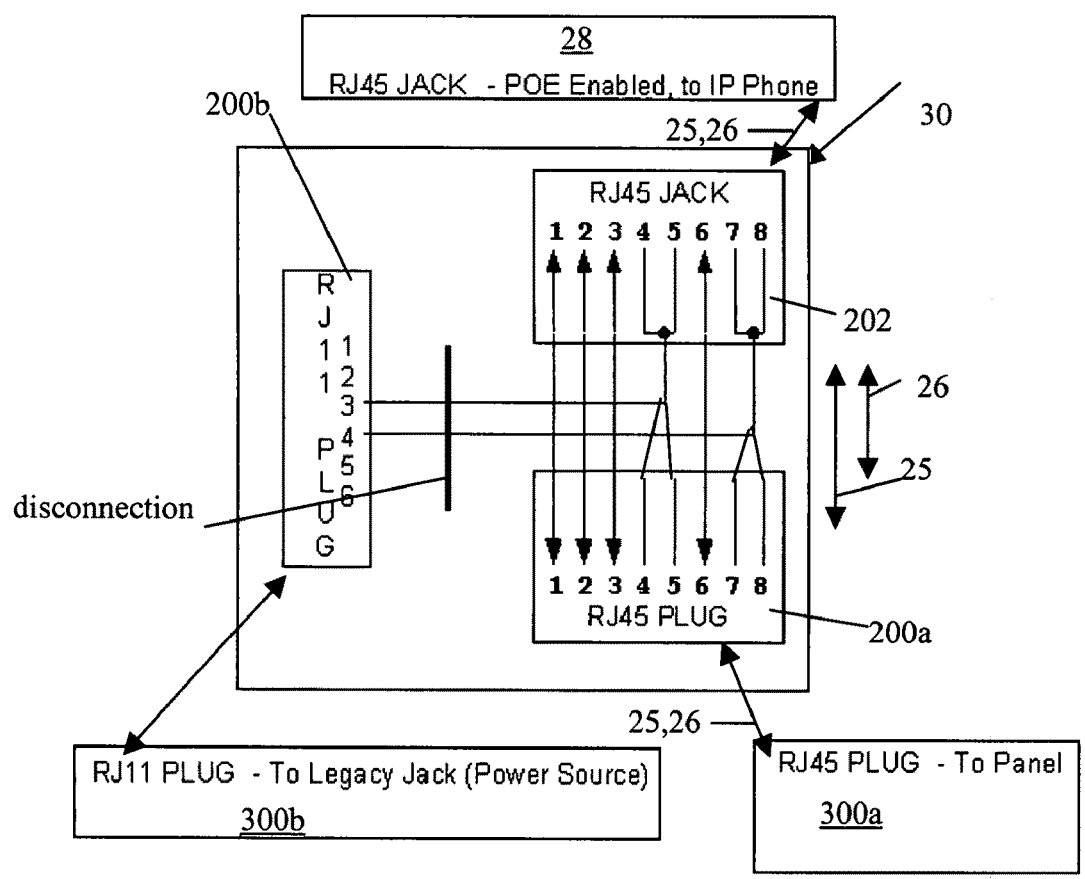
Figure 5C:
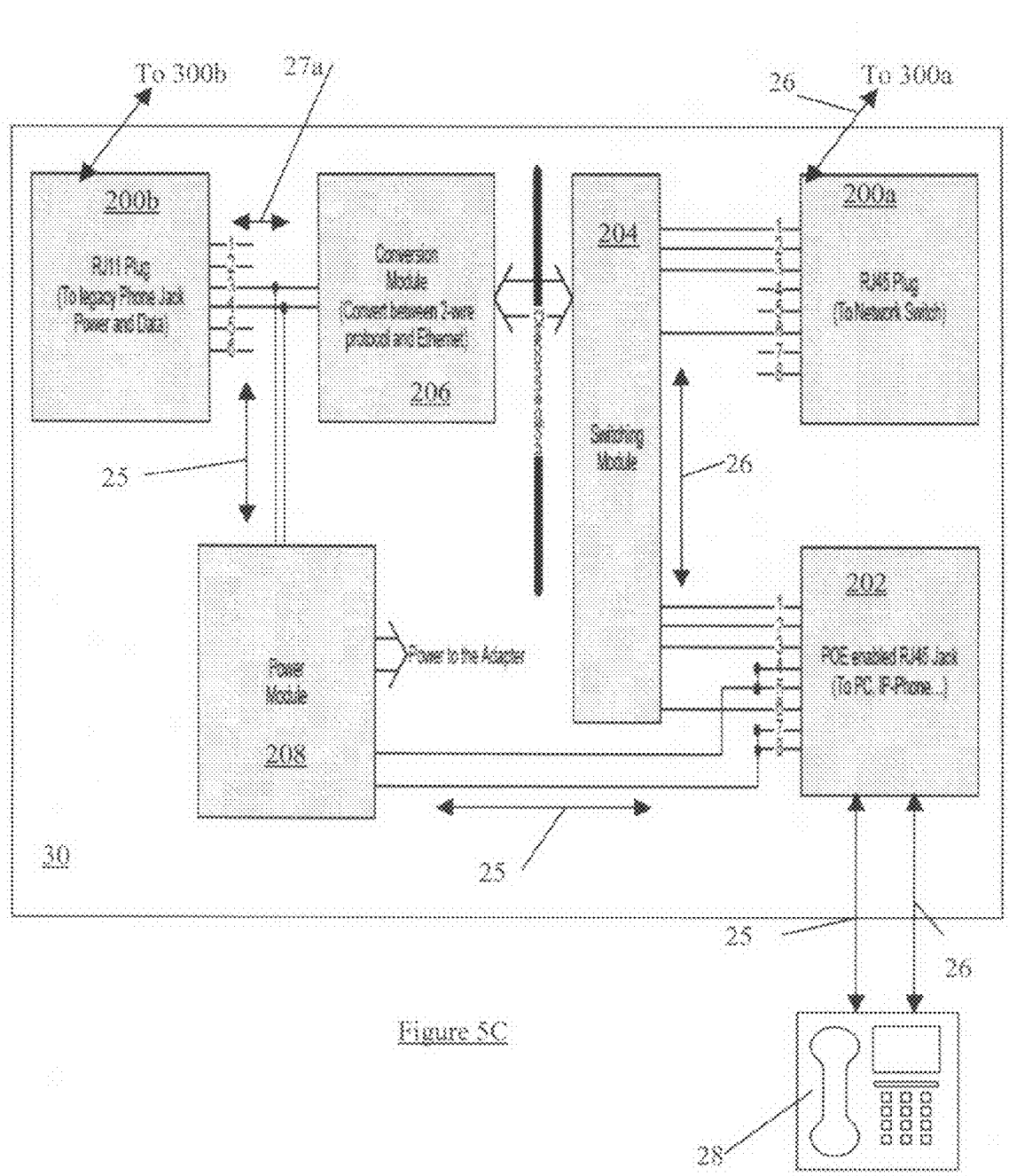
Figure 5D:
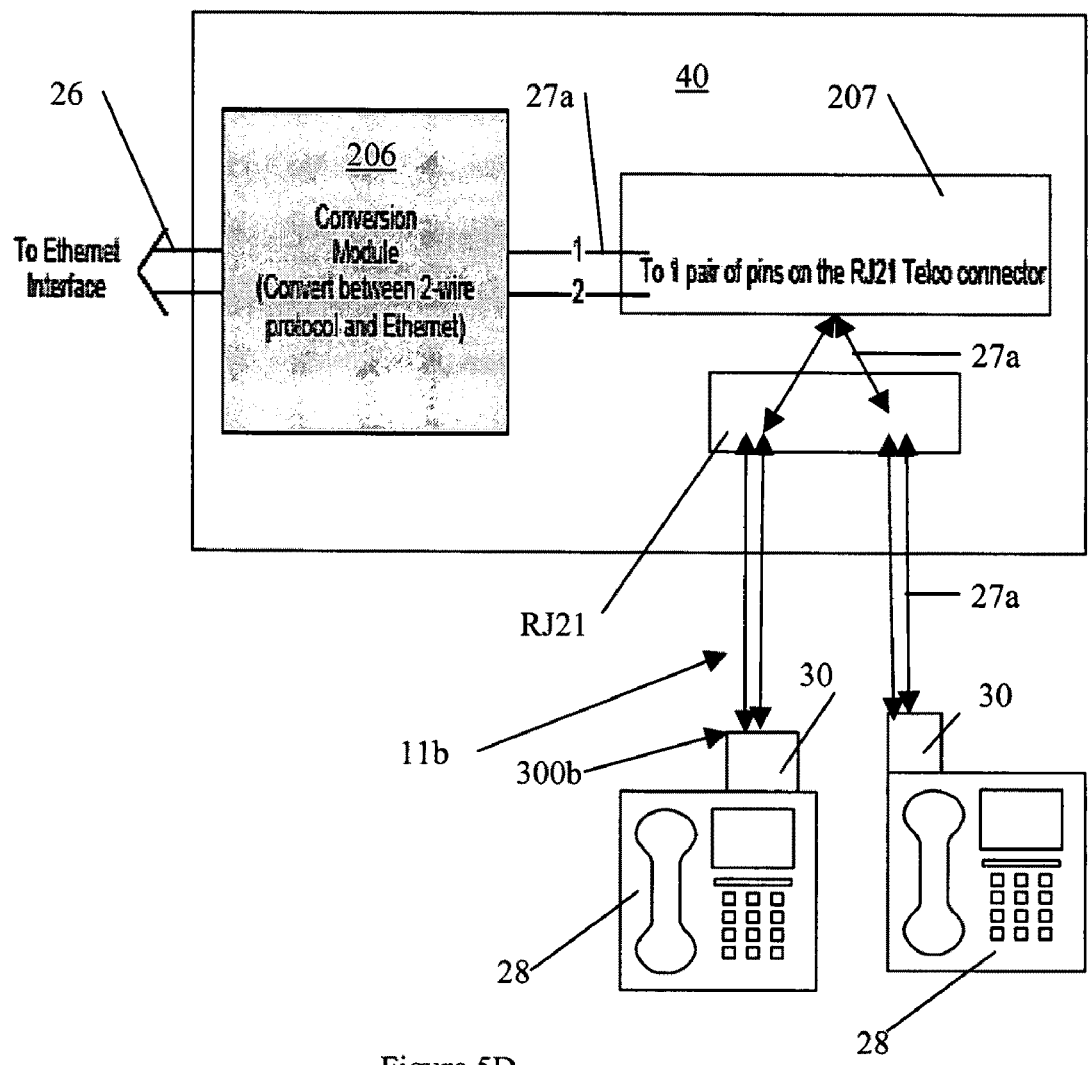

Referring to FIG. 5d, shown is the complementary transformation module 206 in the unit 40 corresponding to the transformation module 206 in the adapter 30 (see FIG. 3), connected to the pair of telephone wires (one of the wire pairs of the network 11b) coming from the adapter 30 that is coupled via the network jack 300b to the communications device 28. The wire pair 1, 2 of the unit 40 interface (e.g. RJ 21 connector) is connected to wire pair 3,4 of the RJ11 plug (network jack 300b) to which the communications device 28 is coupled. As well, a routing module 207 of the unit 40 can be used to select which of the wire pairs from the unit interface (e.g. RJ 21) are to be used to communicate the data 27a over the network 11b to the particular/selected communications device 28 that that data 27a is intended for. It is recognised that the conversion module 206 and the routing module 207 can be combined, as desired.

Example Device 28 and/or Adapter 30, Unit 40 Configuration

Figure 2:
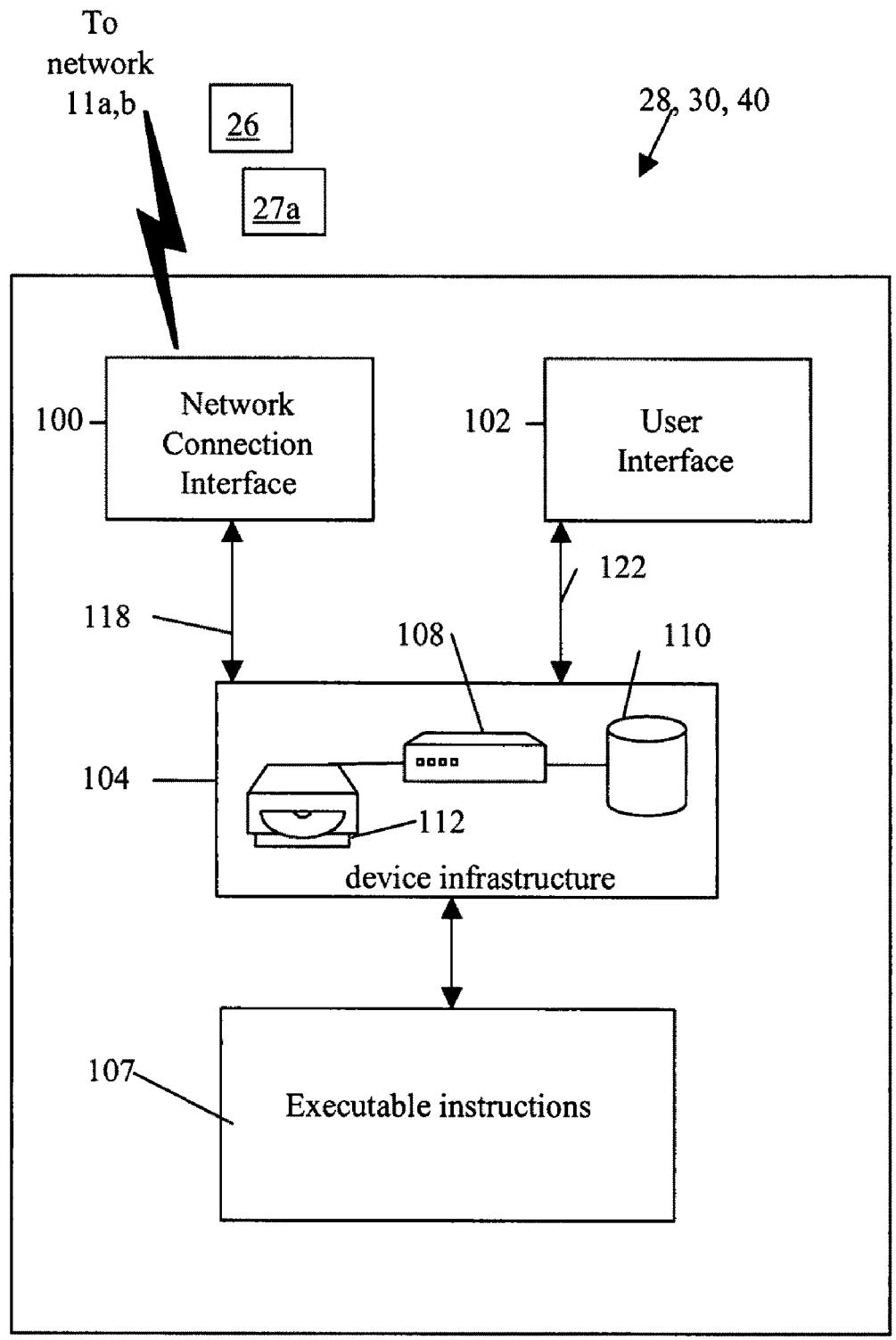

Referring to FIG. 2, the device 28 and/or the adapter 30, unit 40 can include a network interface 100 (e.g. transceiver/modem) coupled via connection 118 to an infrastructure 104. The network interface 100 (e.g. the ports 200a,b, 202 for the adapter 30—see FIG. 3) is connectable during operation of the device 28 and/or the adapter 30 to the network 11a,b by a suitable channel, e.g. wireless RF or IR links or Ethernet/Internet connection, which enables the device 28 and/or the adapter 30 to communicate with each other and with external systems (such as the network server 22 and the LEC in the case of the adapter 30) via the network 11a,b. The network 11a,b supports the transmission of data 26 (e.g. voice, voice and associated video, etc.) and associated initialization messages (e.g. DHCP, BOOTP, SIP messages) for the communications device 28.

Referring again to FIG. 2, the device 28 and/or the adapter 30 can also have a user interface 102, coupled to the infrastructure 104 by connection 122, to interact with a user (not shown). The user interface 102 can include one or more user input devices such as but not limited to a USB port, a QWERTY keyboard, a keypad, a track wheel, a stylus, and a user output device such as an LCD screen display. If the screen is touch sensitive, then the display can also be used as the user input device as controlled by the infrastructure 104. The user interface 102 can be employed by the user of the device 28 and/or the adapter 30 to facilitate a voice communication over the network 11a,b (in the case of the device 28) and to facilitate programming of switch/translation logic (in the case of the adapter 30). For example, the communications device 28 might simply have a touch screen 102. In this case, the number of square inches available on the display 102 may determine the maximum number of lines accessible to the user. Other variations on user interface 102 design might include the use of pull-down menus or scroll bars to select a phone line. Another example of the interface 102 is a PC softphone, which is an application program running on a desktop computer where the user can select a phone line from the display 102 with a mouse click.

Referring again to FIG. 2, operation of the device 28 and/or the adapter 30 can be enabled by the infrastructure 104. The infrastructure 104 can include a computer processor 108 and associated memory module 110. The computer processor 108 manipulates the operation of the device 28 and/or the adapter 30 configured for the intended task through operation of the network interface 100, the user interface 102 and other application programs/hardware 107 of the device 28, 30 by executing task related instructions. These task related instructions can be provided by an operating system, and/or software applications 107 located in the memory 110, and/or by operability that is configured into the electronic/digital circuitry of the processor(s) 108 designed to perform the specific task(s). Further, it is recognized that the infrastructure 104 can include a computer readable storage medium 112 coupled to the processor 108 for providing instructions to the processor 108 and/or to load/update the device 28 and/or the adapter 30 with configuration data in the memory module 110. The computer readable medium 112 can include hardware and/or software such as, by way of example only, magnetic disks, magnetic tape, optically readable medium such as CD/DVD ROMS, and memory cards. In each case, the computer readable medium 112 may take the form of a flash memory, small disk, floppy diskette, cassette, hard disk drive, solid-state memory card, or RAM provided in the memory module 110. It should be noted that the above listed example computer readable mediums 112 can be used either alone or in combination.

Further, it is recognized that the device 28 and/or the adapter 30 can include the executable applications 107 comprising code or machine-readable instructions for implementing predetermined functions/operations. The processor 108 as used herein is a configured device and/or set of machine-readable instructions for performing operations as described by example above. As used herein, the processor 108 may comprise any one or combination of, hardware, and/or a combination of hardware and software. The processor 108 acts upon information by manipulating, analyzing, modifying, converting or transmitting information for use by an executable procedure or an information device, and/or by routing the information with respect to an output device. The processor 108 may use or comprise the capabilities of a controller or microprocessor, for example. Accordingly, any of the functionality of the adapter 30 (e.g. modules 200a,b, 202, 204, 206, 207, 208, 210, 212, and subset thereof) may be implemented in hardware/software. Accordingly, the use of a processor 108 as a device and/or as a set of machine-readable instructions is hereafter referred to generically as a processor/module for sake of simplicity. Further, it is recognised that any functionality of the modules 200a,b, 202, 204, 206, 207, 208, 210, 212 can be combined as shown, further subdivided into additional modules, or combined into fewer modules, as desired.

Communications Device 28

Referring to FIG. 1a, the communications devices 28 (e.g. VoIP phone) are used to receive incoming phone calls and to place outgoing phone calls, which are automatically routed with respect to the communications device 28 using the assigned network 11a address, regardless of where the communications device 28 is physically connected to the network 11a, i.e. what particular network jack 300a is used. For example, the user can take their communications device 28 with them on a trip, and wherever they connect to the Internet, they can receive incoming calls. Accordingly, operation of VoIP is location independent and only an Internet/Ethernet connection is needed to get a registered connection to a VoIP provider, further described below.

Referring to FIG. 1a, there are many examples of the communications device 28 suitable for facilitating voice communication (e.g. VoIP) over the network 11a. One example of the communications device 28 is an analog telephone connected to an ATA (Analog Telephone Adaptor), which is coupled to the network jack 300a via the adapter 30. The ATA provides for a standard phone to be connected to the network 11a (e.g. Internet) connection (e.g. network server 22) for use with VoIP. For example, voice service providers like Vonage™ and AT&T CallVantage™ bundle ATAs with their service.

A further example of the communications device 28 are IP Phones, which are specialized phones that look like normal phones with a handset, cradle and buttons. The IP phones can have an RJ-45 Ethernet connector for connecting directly to the network 11a, via the adapter 30, instead of having the standard RJ-11 phone connectors. IP phones are configured to be coupled with the network server 22 and have all the hardware and software onboard to handle voice communications using IP protocols and/or SIP for the call (e.g. call data 26). The communications device 28 can also be an IP enabled printer for communicating print data 26.

A further example of the communications device 28 is a computer configured for VoIP communications, using VoIP software, a microphone, speakers, a sound card and an Internet connection via the network server 22 (e.g. via a cable or DSL modem). A further example of the communications device 28 is a PDA that is communicates through one of the adapters 30. The communications device 28 can also be a computer configured for message communication of data 26, 27a other than call data over the networks 11a, 11b, e.g. a computer not configured/using for VoIP and instead using any network browser/FTP application for communication of the data 26, 27a (non-VOIP data) over the networks 11a,b. In this example, the network 11b is used as a backup network in the case of data 26 communication problems on the network 11a, such that the data 26 is transformed by the adapter 30 into the formatted data 27a for communication to the unit 40 over the network 11b.

It is recognised that the communications device 28 can be embodied as a hardware endpoint or a software endpoint. Hardware endpoints are communication devices 28 with the look, feel, and shape of a traditional telephone, but can use IP, SIP, H.323 and RTP for communication. Some of these hardware endpoints can use Electronic Numbering (ENUM) or DUNDi to translate existing phone numbers to SIP addresses using DNS, so calls to other SIP users can bypass the telephone network. Software endpoints are also common which use a computer to emulate the voice/video functionality of a phone, such as but not limited to; Microsoft Windows Messenger, iChat AV, Twinkle, Ekiga, Kphone, and other GPL applications.

The communication device 28 has the device identity assigned, which is associated with each of the calls (e.g. call data 26) that interact with the communication device 28. One example of this device identity is the MAC address (Media Access Control), which represents the communication device's 28 name (e.g. ID) on a LAN. An Ethernet MAC address can be a six-byte number, usually expressed as a twelve digit hexadecimal number (Example: 1AB4C234AB1F). The MAC address is used by the Media Access Control sublayer of the Data-Link Layer (DLC) of telecommunication protocols. There is a different MAC sublayer for each physical device type. Also known as the hardware address or Ethernet address, the MAC address is a unique identifier specific to the network card inside the communications device 28 that allows the DHCP registration process to authenticate that the communications device 28 is allowed to access the network 11a. In general, MAC Addresses are of the form XX-XX-XX-XX-XX-XX, where the X's are digits and/or letters from A to F. The MAC address makes the communications device 28 recognizable to and distinguishable from other communications devices 28, as an identity code built into every Ethernet card, which uniquely identifies that card from all others in the world. The MAC addresses can either be "universally administered addresses" or "locally administered addresses", such that a universally administered address (sometimes called "burned-in address") is uniquely assigned to a communication device 28 by its manufacturer. It is recognised that the device ID can be always unique to facilitate identification of a particular communications device 28.

ARP (Address Resolution Protocol) is used to convert from addresses in a layer 3 protocol such as Internet Protocol (IP) to the layer 2 MAC address. On broadcast networks 11a, such as Ethernet, the MAC address allows each communications device 28 to be uniquely identified and allows data 26 communicated over the network 11a to be marked for specific communications devices 28 via the network 11a connection point, i.e. the network jack 300a.

Communication Mode Adapter 30

The Adapter 30 can be considered as a 3-port switch, for example, with 2 ports connecting to Ethernet (e.g. Primary) and one port connecting to a 2-wire interface (e.g. secondary). The 2-wire interface can function as an Ethernet extender, rubber-banding the Ethernet packets (e.g. data 26) over 2-wires. The 2-wire interface can use HPNA, DSL, AMI or other proprietary protocol. The front end port 202 can have an Ethernet interface to connect to Ethernet devices like PCs and IP Phones. The backend ports 200a,b can consist of two interfaces: a primary Ethernet 200a and a secondary 2-wire interface 200b.

Figure 3:
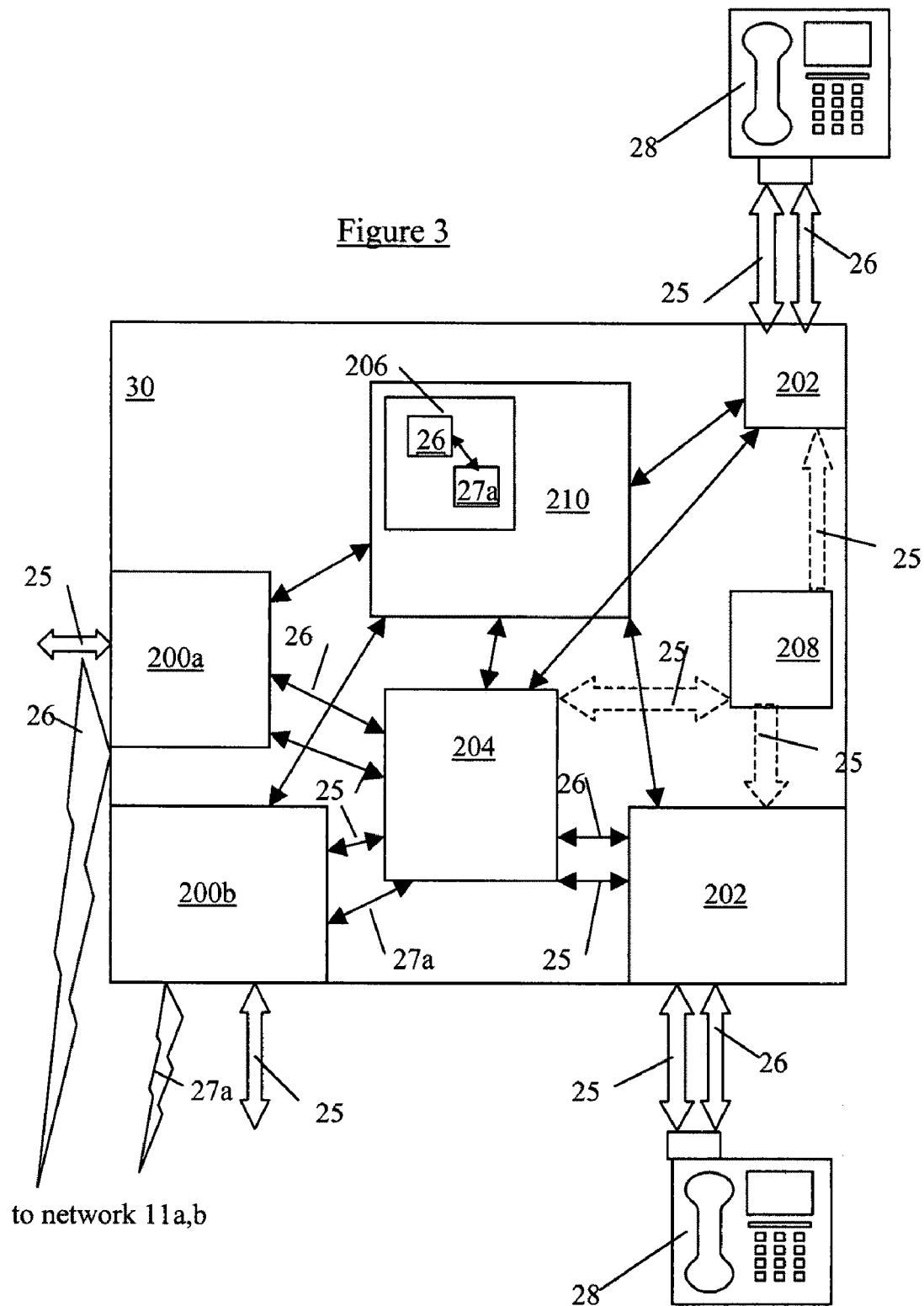

Referring to FIGS. 1a and 3, shown is the communication mode adapter 30 for directing the flow of call data 26 between the communications network 11a and the communications device 28, and the flow of telephone communications 27a between the telephone network 11b and the communications device 28. The adapter 30 has a network port 200a for coupling to the communications network 11a (e.g. Ethernet), a telephone network port 200b (or ports in the case of multiple dedicated telephone lines/numbers—not shown) configured for coupling to the telephone network 11b (e.g. for digital telephone two-wire communication) and one or more device port(s) 202 for coupling to the communications device(s) 28. It is recognised that the device port 202 can be configured for communicating with the communications device 28 in the packet-based data 26 format as used by the communications device 28.

The adapter 30 also has a switching module 204 for connecting the port 202 to either the network port 200a or the telephone port 200b, as further described below. The adapter also has a translation module 206 for translating between a first communication protocol (e.g. packet-based for the call data 26) for the communications network 11a and a second communication protocol (e.g. DSL for the telephone communications data 27a) for the telephone network 11b. The adapter 30 can also have a power module 208 for managing power requirements of the adapter 30 as well as any inline power (e.g. POE and/or that needed by POTS) used in operation of the devices 28, 30. The adapter can also have a command module 210 for monitoring the state of the switching module 204, as well as the configuration of the ports 200a,b, 202 and/or the operation of the power module 208.

Data 26 Communication

Referring to FIG. 3, shown is the adapter 30 having the network port 200a for coupling the adapter 30 to the network 11a (e.g. an intranet) and the device port 202 for connecting to a communications port 204 of the communications device 28. It is recognised that the device port 202 could incorporate the functionality of the switching module 204, as desired. The ports 200a, 202 are configured so as to facilitate the communication of any data 26 (e.g. data packet(s)) entering any port to be broadcast out on every/selected port other than the port of entry. For example, the adapter 30 communicates all data 26 received from the network 11a via the network port 200a to the device port 202 and vice versa. It is recognised that the adapter 30 can operate similar to a hub in that the adapter 30 forwards all data 26 in both directions between the ports 200a, 202, or the adapter 30 can use the switching module 204 for directing the data 26 between one or more ports 200a and/or ports 202, as desired. It is recognised that the data 26 formats can be the same or similar for the ports 200a, 202 in that they are configured as packet-based communications that are suitable for operation with the communications device 28 and the network 11a.

One example operation of the adapter 30 for data 26 communication is as a passive hub that serves as a conduit for the data 26, enabling that data 26 to go from the communications device 28 (or segment) to the network server 22 via the network 11a (e.g. from port 202 to port 200a) and vice-versa. The adapter 30 can also have features of an intelligent/manageable hub for monitoring the data 26 traffic passing through the adapter 30 and to configure the switching module 204 and/or respective ports 200a,b, 202 accordingly, as further described below. Another example operation of the adapter 30 for data 26 communications is as a switching hub, which actually reads the destination address of each data 26 packet (or group of packets) and then forwards the data 26 packet to the correct port 200a,b, 202. Regarded in the switching aspects, adapter 30 can also include a router, as desired.

It is recognised that in the case of wireless communications, the adapter 30 can have the device port 202 configured as a short-range wireless communication module, such as but not limited to Bluetooth™ technology, facilitating transmission of signals over short distances between communication devices 28 and the adapter 30 without the use of wires. The short-range wireless module can provide functionality similar to a cable or infrared connections for communication of data 26 between the communication devices 28 and the network 11a connection adjacent to the communication device 28. For example, the short-range wireless module can be compatible with bandwidth capabilities of between 500-2000 kbits and a range of approximately 1-5-10 meters. It is recognised that line-of-sight may not be required between the devices for the short-range wireless communications of the data 26. For example, Bluetooth transmits in the frequency range 2.4 to 2.4835 GHz and achieves data rates of up to 721 kilobits per second for ranges of up to 10 meters. The short-range wireless communication module can facilitate radio interfacing between the devices 28 and the adapter 30.

In any event, it is recognised that the adapter converts the format of the call data 26 to that of call data 27a suitable for communication over the network 11b, when the port 202 is connected to the port 200b. It is recognised that alternatively, the call data 26, 27a could be just data used for applications other than VOIP.

Power Supply 208

Referring again to FIG. 3, the adaptor 30 is connected to the power source 208 for facilitating operation of the adaptor 30. For example, the power source 208 can be an independent power source or the power 25 can be supplied to the adaptor 30 via Power over Ethernet (POE) (also known as Power over LAN (POL) and inline power), used to facilitate the powering of attached devices via Ethernet ports (e.g. the ports 200a, 202). In the case of POE, the power 25 would enter the adaptor 30 via the network port 200, for example. Regarding POE, the IEEE 802.3af standard is one example that provides 48 volts DC over two of the four available pairs on a Cat. 3/Cat. 5 cable with a maximum current of 400 milliamperes for a maximum load power of 15.4 watts. Further, it is recognised that the powered pairs may also carry the data 26, which facilitates the use of 1000BASE-T (Gigabit Ethernet) for all four pairs for data 26 transmissions. Accordingly, the adaptor 30 has access to power 25 via the power source 208 for operation of the adaptor 30, for example, or the adaptor 30 can also be configured as a conduit for providing power to the communications device 28 (e.g. via POE). For example, the device port 202 provides the delivery of power 25 for operating the communications device 28, as well as for facilitating communication of the data 26 to/from the network 11a and/or data 27b to/from the network 11b. For example, the adaptor 30 can incorporate an independent power supply to act as a POE injector, having the data port 200a,b, the device port 202 (data 26 plus power 25 port) and the separate power supply 208 (e.g. 48V DC power supply) which provides power 25 to the device port 202. In the case of the network 11b and the inline power supplied by the POTS system, the power module 208 could be used to supplement the power 25 provided by (e.g. sourced from) the network 11b appropriate to the power requirements of the communications device 28. It is recognised that switching circuitry of the switching module 204 and/or the power module 208 can be used to coordinate the power 25 supplied between the networks 11a,b and the communications device 28, as desired.

Accordingly, in view of the above, the adaptor 30 can receive power 25: from the POE (e.g. as defined by IEEE 802.3af) from the network 11a when connected thereto by the switching module 204; using an ultra-low power IC in conjunction with a trickle-charge mechanism off of the network 11a cable to charge a battery or capacitor for providing adequate power 25 for the monitoring and registration processes; power from the network 11b when connected thereto by the switching module 204; and/or using the traditional power source 208, as desired.

Further, it is recognised that the power 25 can be sourced to the adaptor 30 by the conversion unit 40 over the secondary 2-wire interface (e.g. network 11b). Optionally the adaptor 30 could also function as a PD (Powered Device) drawing power off of the POE enabled Ethernet switch via the network 11a.

Switching Module 204

Referring again to FIGS. 3 and 5a,b,c, the switching module 204 can be used to switch the flow of data 26 (and/or power 25) to/from the device port 202 to either of the network ports 200a, 200b, depending on the configuration of the networks 11a,b as monitored by the command module 210. Referring to FIG. 5a, shown are example connections between the port 200b and the port 202 and disconnections between the port 200a and the port 202, as made by the switching module 204. It should be noted that the power 25 can be supplied from the tip and ring connections (e.g. 3-4) of the port 200b to the spare connections 4-5 and 7-8 of the device port 202. Accordingly, the power 25 for the port 202 can be supplied from the network 11b while the data 26 of the device 28 is converted (into the data format 27a by the translation module 206) and then redirected from connections 1, 2, 3, 6 of the port 202 over the connections 3-4 of the network port 200b as communication data 27a, e.g. as data carried over DC. Accordingly, data 26 is routed by the switching module 204 between the communications device 28 and the network jack 300b (e.g. RJ11 Plug) via the conversion module 206. At this stage, both data 27a and power 25 can be transported over 2-wire. This switching enables existing data communication cabling (i.e. network 11b) to supply inline power 25 obtained from the network 11b as well as to facilitate communication of the data 26 as data 27a to the unit 40. It is noted that the data 26 from the communications device 28 on connections 1, 2, 3, 6 of the port 202 is switched from the connections 1, 2, 3, 6 of the port 200a to the tip and ring connections (e.g. for 4 pin connections 2, 3, for 6 pin connections 3, 4 and for 8 pin connections 4, 5) of the port 200b as converted data 27a and vice versa.

Further, it is recognised that the power 25 can continue to come from the network jack 300a while the data 26 is transmitted as transformed data 27a via the network jack 300b, as desired. Further, referring to FIG. 5c, the 2-wire is disconnected for data 26 and the data 26 is rerouted between the device port 202 (e.g. RJ45 Jack) and the network jack 300a (e.g. RJ45 Plug) through the switching module 204, while the power 25 continues to be sourced from the network jack 300b (e.g. RJ 11 plug) via the power module 208.

This is compared to FIG. 5b, showing the disconnection of the connections 1, 2, 3, 4, 5, 6 of the ports 200b by the switching module 204 and the coupling made between connections 1, 2, 3, 4, 5, 6, 7, 8 of the port 200a with the corresponding connections 1, 2, 3, 4, 5, 6, 7, 8 of the device port 202, thus facilitating the communication of both inline power 25 and the call data 26 there-between. In this switching case, it is recognised that there may be no conversion of the data 26 involved and therefore data 26 flows directly from the network 11a to the communications device 28 and vice-versa. Further, it is recognised that the connections 1, 2, 3, 4, 5, 6 of the port 200b are disconnected from the corresponding connections 1, 2, 3, 4, 5, 6, 7, 8 of the port 202.

Command Module 210

It is recognised that a command module 210 would also monitor the data 26, 27a and/or power 25 communications between all (not shown) of the ports 200a,b, 202 of the adapter 30 of FIG. 3. Further, the command module 210 (for example in conjunction with the translation module 206) can contain logic to translate between Ethernet (e.g. RJ 45) and 2-wire communication protocols (e.g. RJ 11). The command module 210 (for example in conjunction with the switching module 204) can also contain switching logic to switch between two backend interfaces: the primary Ethernet port 200a and secondary 2-wire port 200b, for example. The switching can be triggered by one of the following events, such as but not limited to: a message or command from an external source; monitoring logic within the command module 210 and/or the ports 200a,b, 202 themselves that detects power 25 and network 11a,b outages; and monitoring logic within the command module 210 and/or the ports 200a,b, 202 themselves that detects network 11a,b data communication overloads and/or routing inefficiencies/inconsistencies.

For example, other functionality monitored by the command module 210 can include trigger logic, whereby switching between the ports 200a, 200b can be triggered by messages/commands from external sources (e.g. administration server 24) or by network monitoring logic within the adapter 30 itself. The adapter 30 is capable of responding to management commands (e.g. SNMP) from monitoring, analysis or other management software that can be implemented by the command module 210 and/or configured into the ports 200a, b, 202 themselves. The management commands could indicate the routing choice: primary 200a or secondary 200b ports, for example, for the call information contained in the data 26, 27a. On receiving a command, the adapter 30 would switch the data 26, 27a traffic to the requested route if it is different from the current route. In terms of network congestion, the adapter 30 can continuously monitor the data 26, 27a traffic and if the command module 210 detects delays above a pre-determined threshold value, the data 26, 27a from that point on could be rerouted to the 2-wire backup interface port 200b, and optionally a notification is sent to a management server (e.g. administration server 24). In this mode, the adapter 30 could continue to route the data 26, 27a over the selected alternate interface port (e.g. secondary 200b for all call data 26 once translated into the communication data 27a format, or example) until the adapter 30 receives a command to revert to the initial interface (e.g. primary 200a for all call data 26 that may not need any translation for communication over the network 11a as received from the communications device 28). Further, it is recognised that in terms of hardware, the adapter 30 can perform low-level monitoring of the signalling on the main interface (e.g. port 200a,b) to determine corresponding network 11a,b or power 25 outages. When the adapter 30 senses a hardware failure that could be the result of a network 11a,b or power outage on the main interface, the adapter 30 can reroute the data 26, 27a traffic to the selected secondary interface (e.g. from port 200a to port 200b or from port 200b to port 200a).

In view of the above, it is recognised that the adapter 30 can be hardware, software, or a combination thereof. In particular, the ports 200a,b, 202 and modules 204, 206, 208, 210, 212 can also be embodied as hardware and/or programmed instructions (e.g. software), as desired, in order to individually and/or cooperatively perform the above mentioned functionality of the adapter 30.

Adapter 30 Example

As described above, the adapter 30 can operate in a fashion similar to a hub in that it normally forwards all packets (i.e. data 26) in both directions between the network 11a (e.g. via the network server 22) and the communications device 28. In one embodiment, referring to FIG. 4, the adapter 30 is mounted on the front of a faceplate 140 that is in turn connected to the intranet 11a connected to the network server 22 and the network 11b connected to the PBX directly (not shown) or optionally through the conversion unit 40 (see FIG. 1b), as desired. In a second embodiment (not shown), the adapter 30 can be mounted on the rear of the faceplate 140 and thus connected to both of the networks 11a,b. It is also recognised that the adapter 30 could be integrated into the design of he faceplate 140, as desired.

In view of the above, it is recognised that the adapter 30 can be used as a backup system for data 26, 27a communication in the event of power or LAN failure (e.g. failure of one of the networks 11a,b). In case of LAN overload, switching of data from one port 200a,b, to the other port 200a,b can be done dynamically due to identified network 11a,b, problems. The switching of the data 26, 27a onto the secondary network 11a,b can be controlled by monitoring software and/or hardware of the adapter 30 that detects link down. The adapter 30 can also be used for analysis before migrating to a converged network.

Further, to the user of the communication devices 28, operation of the adapter 30 (when connected to both of the port types 200a,b) can be no different from a regular RJ45 or other network jack. The adapter 30 can support packet based communications over Legacy lines; packet based communications over LAN with Legacy lines as backup; and packet based communications over LAN.

Further, in the case of a downed network 11a,b (e.g. downed LAN 11a as a result of power outage or equipment failure or loss of data signalling), the adapter 30 can independent of the LAN provide power 25 supplied from the power module 208 and/or from the conversion unit 40 (e.g. the unit 40 provides the power 25 suitable for operation of the communication device 28 and routes data 26 over the legacy lines as telephone data 27a. In the event that the network 11b service is interrupted, the adapter 30 can route communications 27a as converted call data 26 over the network 11a (as well as supply any needed operating power 25 to the communication devices 28).

It is recognised that in view of the above, the adapter 30 can also be configured to convert the communications format of the data 26 to the communications format of the data 27b (e.g. analogue—POTS) using a packet-based to dial-up based format conversion process, for example. It is recognized that in the event of using dial-up for communication of the data 26 over the network 11b as data 27b, the corresponding network jack 300b (and communications device 28) would use the dedicated phone number/line assigned to that network jack 300b. In other words, the statically assigned network 11b telephone number/line (e.g. a physical dedicated telephone number/line) of the telephone network jack 300b would provide the network 11b entry point for the coupled communications device 28, for the adapter 30 using the data 27b format.

It is also recognised that in view of the above, the call data 26, 27a could also be any other form of digital data that is communicated between computers connected to the networks 11a,b. For example, the data 26 could be data messaging (request response messages) between two or more computers connected via the networks 11a,b that does not involve the use of the computer as an IP phone (e.g. email messages and Internet browser based messaging and associated data transfers).

Accordingly, the adapter 30 allows the communications device 28 to transparently operate over the LAN network 11a via one of two paths. The secondary (e.g. 2-wire path) network 11b uses a different protocol from that of the primary (e.g. Ethernet) protocol of the network 11a. To the communications device 28, it makes no difference which path is being used to connect to the network via the device port 202; the communications device 28 just knows that it's still on the network via the device port 202 regardless of the type of connection. The network 11b (using tip and ring connections e.g. 2-wire) connection can be transparent to the communications device 28, so to the communications device 28 it is no different from being connected directly over network 11a. Internally, the conversion/transformation of the data 26 format to the data 27a format is done on the network 11b between the adapter 30 and the unit 40, and as such may not be visible from the network 11a and communications device 28 external to the network 11b.

Like the adapter, the central unit 40 converts data between the primary and secondary communication protocols (e.g. Ethernet and 2-wire formats) in such a way as to make the communication devices 28 function with respect to data 26 communication to and from the device 28 as it would when directly on the network 11a (e.g. Ethernet), irrespective of the data path. Further, the central unit 40 aggregates data 26, 27a from the different communication end points (from the network 11a and from the network 11b) for transportation over the LAN and distributes data from the LAN to specific endpoints based on the MAC/network 11a address of the communications device 28. Further, it is recognised that the central unit 40 and/or the adapter 30 is capable of providing power 25 to the communication devices 28.

I claim:

1. A system for coupling a digital communications device to a primary data communications network having a first communications format for carrying packetized data and to a secondary data communications network having a second communications format being a 2-wire communication protocol, the digital communications device configured to have an assigned device identification and configured for using an assigned network address as an entry point for the primary data communications network for use in routing the packetized data over the primary data communications network, the system comprising:
    an adapter including:
        a first device port configured for connecting to the digital communications device as a communication endpoint for the packetized data using the assigned network address;
        a second network port configured for connecting to the primary data communications network and facilitating direct communication of the packetized data between the primary data communications network and the digital communications device through the first device port;
        a third network port configured for connecting to the secondary data communications network and facilitating communication of first or second converted data between the secondary data communications network and the adapter, the first or second converted data having the 2-wire communications protocol;
        a conversion module between the first device port and the third network port configured for converting from the packetized data to the first converted data for data communication from the first device port to the third network port and from the second converted data to the packetized data for data communication from the third network port to the first device port; and
        a switching module coupled to the ports and configured for selectively switching a selected communication path of the packetized data between either the first device port and the second network port or between the first device port and the third network port; and
    a conversion device coupled between the primary communications network and the secondary communications network, the conversion device configured for:
        converting the first converted data, sent from the third network port of the adapter, to packetized data of the first communications format and directing the packetized data to the primary communications network; and
        converting the packetized data received from the primary communications network to the second converted data of the second communications format and directing the second converted data towards the third network port of the adapter.

2. The system of claim 1 further comprising the switching module configured for providing a selected power path for supplying operating power for the digital communications device through the first device port, by way of the second network port, or by way of the third network port, in the event of a power outage detected on the currently selected communication path.

3. The system of claim 2, wherein the assigned network address is an IP address dynamically assigned to the digital communications device when said digital communications device is connected to the first device port.

4. The system of claim 1, wherein the third network port is configured to have a dedicated telephone number assigned thereto when coupled to the secondary data communications network.

5. The system of claim 1, wherein the 2-wire communication protocol is configured for tip and ring connections.

6. The system of claim 5, wherein the 2-wire communication protocol is based on a DSL communication format and the first communication format is an Ethernet format.

7. The system of claim 1, wherein the selected communication path is done on a per packet basis.

8. The system of claim 1 further comprising the first device port configured for providing operating power to the digital communications device, such that the operating power is supplied inline through either the second network port when coupled to the first device port by the switching module or through the third network port when coupled to the first device port by the switching module, the power switching performed in the event of a power outage detected on the currently selected communication path.

9. The system of claim 1 further comprising a power module coupled to the switching module for coordinating an appropriate inline power quantity used as the operating power of the adapter, the inline power selectively obtained from either the secondary data communications network via the third network port or the primary data communications network via the second network port.

10. The system of claim 9 further comprising a command module configured for coordinating said selected communication path as triggered by a trigger event selected from the group comprising: a switching message from a source external to the adapter; determining of a power outage for the operating power of the digital communication device; determining of a network interruption in data communication of the packetized data on the primary data communications network; determining an absence of signal; and determining a data communication overload of the primary data communications network.

11. The system of claim 10 further comprising a fourth device port configured for connecting to a second digital communications device, wherein the fourth device port is connectable to either the second network port or the third network port as a second selected communication path for the packetized data of the second digital communications device.

12. The system of claim 2, wherein the communication path and the power path are independently selected.

13. The system of claim 1, wherein said adapter is powered from the second network port, or the third network port.

14. The system of claim 1, wherein any of the first device port, the second network port or the third network port are configured for wireless communication.

15. The system of claim 1, wherein the 2-wire communication protocol is selected from the group consisting of: circuit switched and packet-based communication.

16. The system of claim 15, wherein the 2-wire communication protocol functions as an Ethernet extender.

17. The system of claim 15, wherein the third network port includes a plurality of wire pairs.

18. The system of claim 12, wherein the power path selected to the primary communications network and the communication path is selected to the secondary communications network.

19. The system of claim 12, wherein the power path selected to the secondary communications network and the communication path is selected to the primary communications network.

20. The system of claim 1, wherein said converting includes translation between Ethernet RJ45 and 2-wire communication RJ11 formats.

21. A method for coupling a digital communications device to a primary data communications network having a first communications format for transporting packetized data and to a secondary data communications network having a second communications format being a 2-wire communication protocol, the digital communications device configured for having an assigned device identification and configured for using an assigned network address as an entry point of the primary data communications network for use in routing the packetized data over the primary data communications network, the method comprising the acts of:

communicating the packetized data to a first device port connected to the digital communications device as a communication endpoint for the packetized data using the assigned network address;

selectively switching a selected communication path of the packetized data between either the first device port and a second network port or between the first device port and a third network port, the second network port connected to the primary data communications network for facilitating the direct communication of the packetized data between the primary data communications network and the digital communications device through the first device port, the third network port connected to the secondary data communications network for facilitating communication of first or second converted data respectively to or from the secondary data communications network, the first or second converted data having the 2-wire communications protocol;

using a conversion module positioned between the first device port and the third network port for converting from the packetized data to the first converted data for data communication from the first device port to the third network port and from the second converted data to the packetized data for data communication from the third network port to the first device port; and converting by a conversion device coupled between the primary communications network and the secondary communications network for either the first converted data, sent from the third network port of the adapter, to packetized data of the first communications format and directing the packetized data to the primary communications network; or the packetized data received from the primary communications network to the second converted data of the second communications format and directing the second converted data towards the third network port of the adapter.

22. The method of claim 21 further comprising the act of providing a selected power path for supplying operating power for the digital communications device through the first device port, by way of the second network port, or by way of the third network port, in the event of a power outage detected on the currently selected communication path.

23. The method of claim 22 further comprising the act of providing operating power to the digital communications device, such that the operating power is supplied inline through either the second network port when coupled to the first device port by the switching module or through the third network port when coupled to the first device port by the switching module, the power switching performed in the event of a power outage detected on the currently selected communication path.

24. The method of claim 23 further comprising the act of coordinating an appropriate inline power quantity used as the operating power of the adapter, the inline power selectively obtained from either the secondary data communications network via the third network port or the primary data communications network via the second network port.

25. The method of claim 24 further comprising the act of coordinating said selected communication path as triggered by a trigger event selected from the group comprising: a switching message from a source external to the adapter; determining of a power outage for the operating power of the digital communication device; determining of a network interruption in data communication of the packetized data on the primary data communications network; determining an absence of signal; and determining a data communication overload of the primary data communications network.

26. The method of claim 25, wherein the device identification is a MAC address.

27. The method of claim 26, wherein the digital communications device is selected from the group comprising: an IP phone; a computer configured for IP telephony; a computer configured for network communication; and an analogue phone connected to an ATA.

28. The method of claim 27, wherein the data is selected from the group comprising: request messages; response messages; call data including voice data; and call data including voice and video data.

29. The method of claim 21, wherein the communication path and network port by way of which electrical power is provided, are independently selected.

30. The method of claim 24, further comprising the act of selectively providing operating power for the adapter by way of the second network port or the third network port.

31. The method of claim 21, wherein any of the first device port, the second network port or the third network port are configured for wireless communication.

32. The method of claim 21, wherein the 2-wire communication protocol is selected from the group consisting of: circuit switched and packet-based communication.

33. The method of claim 32, wherein the 2-wire communication protocol functions as an Ethernet extender.

34. The method of claim 32, wherein the third network port includes a plurality of wire pairs.

35. The method of claim 21, wherein said converting includes translation between Ethernet RJ45 and 2-wire communication RJ11 formats.

* * * * *